(12) United States Patent
Kanta et al.

(10) Patent No.: US 12,412,032 B2
(45) Date of Patent: Sep. 9, 2025

(54) AUTOMATED VERIFICATION OF COMMANDS IN A SOFTWARE PRODUCT GUIDE

(71) Applicant: Red Hat, Inc., Raleigh, NC (US)

(72) Inventors: Srinivasa Bharath Kanta, Bangalore (IN); Ranjini M. Narasiodeyar, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 329 days.

(21) Appl. No.: 17/556,412

(22) Filed: Dec. 20, 2021

(65) Prior Publication Data

US 2023/0196013 A1    Jun. 22, 2023

(51) Int. Cl.
G06F 40/226    (2020.01)
G06F 40/289    (2020.01)
G06N 20/00    (2019.01)

(52) U.S. Cl.
CPC .......... *G06F 40/226* (2020.01); *G06F 40/289* (2020.01); *G06N 20/00* (2019.01)

(58) Field of Classification Search
CPC .. G06F 40/226; G06F 40/289; G06F 9/45512; G06F 8/30; G06F 9/453; G06F 40/216; G06F 40/279; G06N 20/00
See application file for complete search history.

(56) References Cited

U.S. PATENT DOCUMENTS

| | | | |
|---|---|---|---|
| 7,526,770 B2 * | 4/2009 | Snover | G06F 9/544 709/213 |
| 9,235,812 B2 | 1/2016 | Scholtes | |
| 10,608,879 B2 | 3/2020 | Sawal et al. | |
| 10,936,974 B2 | 3/2021 | Chaudhari et al. | |
| 2011/0150432 A1* | 6/2011 | Paul | H04L 65/762 709/227 |
| 2017/0109697 A1* | 4/2017 | Panemangalore | G06F 16/245 |
| 2019/0034172 A1* | 1/2019 | Kostello | G06F 8/20 |
| 2019/0122160 A1* | 4/2019 | Kolandaiswamy | G06F 11/3438 |

(Continued)

FOREIGN PATENT DOCUMENTS

CN    110555212 A    12/2019

OTHER PUBLICATIONS

Author Unknown, "Automated data processing from documents," Amazon Web Services, Inc., accessed Aug. 10, 2021 from https://aws.amazon.com/machine-learning/ml-use-cases/document-processing/, 14 pages.

(Continued)

*Primary Examiner* — Darioush Agahi
(74) *Attorney, Agent, or Firm* — Dority & Manning, P.A.

(57) ABSTRACT

A document that includes a plurality of textual portions is accessed. At least some of the textual portions include an input command that is configured to be directed to a process. For each respective textual portion that includes an input command the respective textual portion is input to a machine-learning model (MLM) that has been trained with a plurality of textual phrases and process identifiers that identify corresponding processes, a process identifier that identifies a process to which the input command included in the respective textual portion is to be directed is received from the MLM, and a command record that identifies the input command is stored in a data structure.

13 Claims, 6 Drawing Sheets

(56) References Cited

U.S. PATENT DOCUMENTS

2022/0269735 A1* 8/2022 Balasubramanian ..... G06F 8/36
2022/0414463 A1* 12/2022 Mittal ...................... G06N 3/08

OTHER PUBLICATIONS

Ripon, S. et al., "Automated Requirements Extraction and Product Configuration Verification for Software Product Line," Automated Software Testing, Feb. 2020, Springer Nature Singapore Pte Ltd, pp. 27-51.
Roychoudhury, S. et al., "A Nlp based Framework to support Document Verification-as-a-Service," 2016 IEEE 20th International Enterprise Distributed Object Computing Conference (EDOC), Sep. 5-9, 2016, Vienna, Austria, IEEE, pp. 139-148.

* cited by examiner

AUTOMATED VERIFICATION OF COMMANDS IN A SOFTWARE PRODUCT GUIDE

BACKGROUND

Software product guides, such as user manuals, installation guides, tutorials, and the like, often identify commands that should be entered into a computing device for the purposes of generating files, initiating processes, configuring aspects of a computing environment, and the like.

SUMMARY

The examples disclosed herein implement automated verification of commands in a software product guide.

In one example a method is provided. The method includes accessing, by a computer system comprising one or more processor devices, a document that comprises a plurality of textual portions, at least some of the textual portions including an input command that is configured to be directed to a process. The method further includes, for each respective textual portion that includes an input command, inputting the respective textual portion to a machine-learning model (MLM) that has been trained with a plurality of textual phrases and process identifiers that identify corresponding processes; receiving, from the MLM in response to the respective textual portion, a process identifier that identifies a process to which the input command included in the respective textual portion is to be directed; and storing, in a data structure, a command record that identifies the input command.

In another example a computer system is provided. The computer system includes one or more processor devices of one or more computing devices. The one or more processor devices are to access a document that comprises a plurality of textual portions, at least some of the textual portions including an input command that is configured to be directed to a process. The one or more processor devices are further to, for each respective textual portion that includes an input command, input the respective textual portion to a machine-learning model (MLM) that has been trained with a plurality of textual phrases and process identifiers that identify corresponding processes; receive, from the MLM in response to the respective textual portion, a process identifier that identifies a process to which the input command included in the respective textual portion is to be directed; and store, in a data structure, a command record that identifies the input command.

In another example a non-transitory computer-readable storage medium is provided. The non-transitory computer-readable storage medium includes executable instructions to cause one or more processor devices to access a document that comprises a plurality of textual portions, at least some of the textual portions including an input command that is configured to be directed to a process. The instructions are further to cause the one or more processor devices to, for each respective textual portion that includes an input command, input the respective textual portion to a machine-learning model (MLM) that has been trained with a plurality of textual phrases and process identifiers that identify corresponding processes; receive, from the MLM in response to the respective textual portion, a process identifier that identifies a process to which the input command included in the respective textual portion is to be directed; and store, in a data structure, a command record that identifies the input command.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
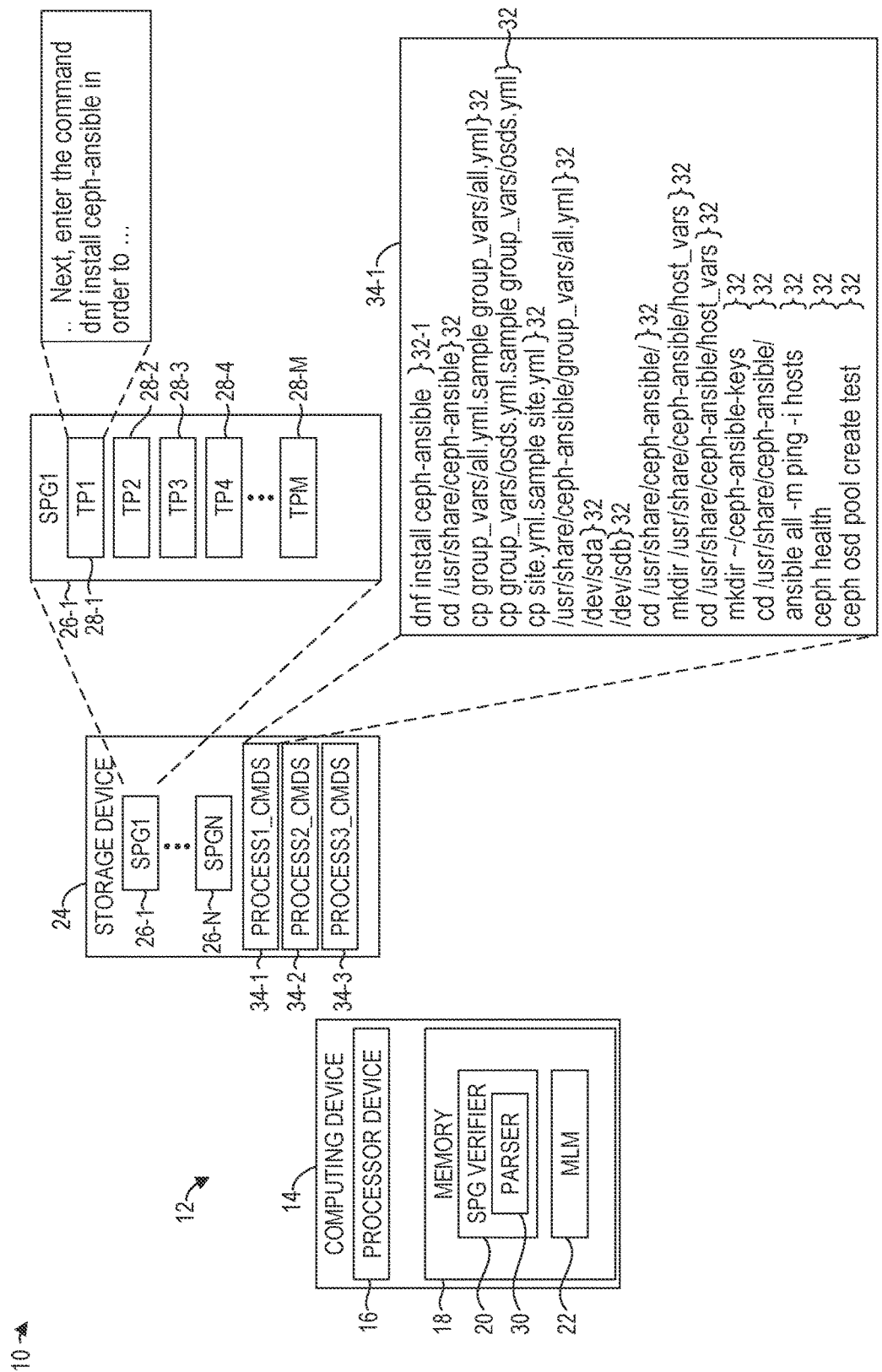
FIG. 1 is a block diagram of an environment in which automated verification of commands in a software product guide can be implemented according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Software product guides, such as user manuals, installation guides, tutorials, and the like, often identify commands that should be entered into a computing device for the purposes of generating files, initiating processes, configuring aspects of a computing environment, and the like.

Most computing processes, such as operating systems, database processes, network processes, daemons (e.g., Linux daemons), and the like, require commands to comply with a strict syntax, and any deviation from the syntax will generally result in an error rather than the execution of the command. An installation guide for a complex software package may include tens or hundreds of commands that are to be directed to various processes in order for the software package to be properly installed, may require the generation of or existence of many different files, and may require that different commands be entered under different types of user credentials. A single typographical error in the installation guide that results in an incorrect command or misidentifies a file name or a user identifier, may result in an error during the installation process, leading to customer dissatisfaction.

Manually attempting to verify the commands and related information in a user guide is time-consuming, and subject to human error. For example, a human that recognizes a command in a user guide may not recognize a small typographical error in the command. The examples disclosed herein implement automated verification of commands in a software product guide. In one implementation, a machine-learning model (MLM) is trained based on textual phrases and process identifiers that identify processes that correspond to the textual phrases. A software product guide document that is made up of a plurality of textual portions, such as sentences, paragraphs, tables, headings, and the like, is accessed. A textual portion that contains an input command that is configured to be directed to a process is input into the MLM, and in response, the MLM outputs a process identifier that identifies the process that corresponds to the textual portion. A command record that identifies the input command is stored in a data structure, such as a file. The input commands identified in the data structure may then be submitted to the corresponding processes. A report may be generated that indicates whether each input command was successful or was unsuccessful. In this manner, hundreds of input commands that may be identified in a software product guide and may be configured to be directed to multiple processes can by automatically verified, thereby eliminating subsequent user confusion and dissatisfaction.

FIG. 1 is a block diagram of an environment 10 in which automated verification of commands in a software product guide can be implemented according to one example. FIG. 1 includes a computer system 12 which, in this example, includes a computing device 14 that in turn includes one or more processor devices 16. While for purposes of illustration the computer system 12 includes only one computing device 14, in other implementations the computer system 12 may include a plurality of computing devices, each of which may include one or more processor devices. The processor device 16 is connected to a memory 18. The memory 18 includes a software program guide (SPG) verifier 20 and an MLM 22. As will be discussed in greater detail with regard to FIG. 3, the MLM 22 has been trained with a plurality of textual phrases and process identifiers that identify corresponding processes. The term "process" in this context refers to an executing process executing on a computing device, such as, by way of non-limiting example, an operating system, a daemon, or any other executing entity configured to receive an input command and to implement a predetermined behavior in response to the input command.

A storage device 24 contains a plurality of documents in the form of software product guides 26-1-26-N (generally, software product guides 26), each of which comprises text and one or more input commands that are configured to be directed to a process executing on a computing device. The software product guides 26 may comprise, for example, software product user manuals, software product installation guides, software product tutorials, or the like. In this example, in response to a request from a user, the SPG verifier 20 accesses the software product guide 26-1. The software product guide 26-1 comprises a plurality of textual portions 28-1-28-M (generally, textual portions 28). The textual portions 28 may comprise, for example, paragraphs, sentences, tables, or any other divisible portion of the software product guide 26-1. In some implementations, a textual portion may be a predetermined number of sentences or paragraphs, or some other divisible unit, such as a predetermined number of pages of the software product guide 26-1.

Some of the textual portions 28 include one or more input commands, and some of the textual portions 28 do not. The SPG verifier 20 iteratively analyzes the textual portions 28. The SPG verifier 20 initially accesses the textual portion 28-1. The SPG verifier 20 may, for example, parse the textual portion 28-1 using a parser 30 that is configured to identify input commands based on a predetermined input command syntax. In some implementations, the parser 30 may comprise one or more regular expressions that are configured to identify input commands in a string of text based on a syntax of the input commands.

If the textual portion 28-1 does not contain an input command, then the SPG verifier 20 accesses the successively next textual portion 28, in this example the textual portion 28-2. If the textual portion 28-1 does contain an input command, the SPG verifier 20 may input the textual portion 28-1 into the MLM 22. The MLM 22, in response to receiving the textual portion 28-1, outputs a process identifier that identifies the process to which the input command is to be directed. The SPG verifier 20 then generates a command record 32-1 that identifies the input command, in this example "dnf install ceph-ansible". A command record 32 may comprise the actual input command or may comprise information via which the input command may be derived. The SPG verifier 20 stores the command record 32-1 in a data structure in a manner that identifies the process to which the input command is to be directed. In this example, the SPG verifier 20 generates different data structures for each process. In particular, the SPG verifier 20 generates different command files 34-1-34-3 for each process referenced in the software product guide 26-1. A command file 34-1 corresponds to a first process "PROCESS1", a command file 34-2 corresponds to a second process "PROCESS2", and a command file 34-3 corresponds to a third process "PROCESS3". The SPG verifier 20 may generate each command file 34-1-34-3 in response to identifying the first input command in the software product guide 26-1 that is to be directed to each particular process. In other examples, the SPG verifier 20 may utilize a single data structure, and identify, in the command record, the process to which the input command is to be directed.

In some implementations, the SPG verifier 20 may parse the textual portion 28-1 and, in parallel, provide the textual portion 28-1 to the MLM 22, and if the MLM 22 returns a null value or other indication that the textual portion 28-1 does not correspond to any process, analyze the next successive textual portion 28.

In some implementations, the command records may include order information that identifies a sequential order in which input commands identified in the command records of the command files 34-1-34-3 are to be directed to the processes that correspond to the command files 34-1-34-3 to ensure that input commands that may be dependent on previously issued input commands occur in a correct sequence.

After processing the textual portion 28-1, the SPG verifier 20 successively processes the textual portions 28-2-28-M and, based on the MLM 22, determines that at least some of the textual portions 28-2-28-M contain input commands directed to three different processes, and stores command records that identify such input commands in the corresponding command files 34-1-34-3 based on the process to which each such input command is to be directed. Thus, after the software product guide 26-1 is completely processed, the command file 34-1 includes a plurality of command records 32-1, 32, each of which identifies an input command that is to be directed to the process "PROCESS1"; the command file 34-2 includes a plurality of command records, each of which identifies an input command that is to be directed to the process "PROCESS2"; and the command file 34-3 includes a plurality of command records, each of which identifies an input command that is to be directed to the process "PROCESS3."

It is noted that, because the SPG verifier 20 is a component of the computer system 12, functionality implemented by the SPG verifier 20 may be attributed to the computer system 12 generally. Moreover, in examples where the SPG verifier 20 comprises software instructions that program the one or more processor devices 16 to carry out functionality discussed herein, functionality implemented by the SPG verifier 20 may be attributed herein to the one or more processor devices 16.

Figure 2:
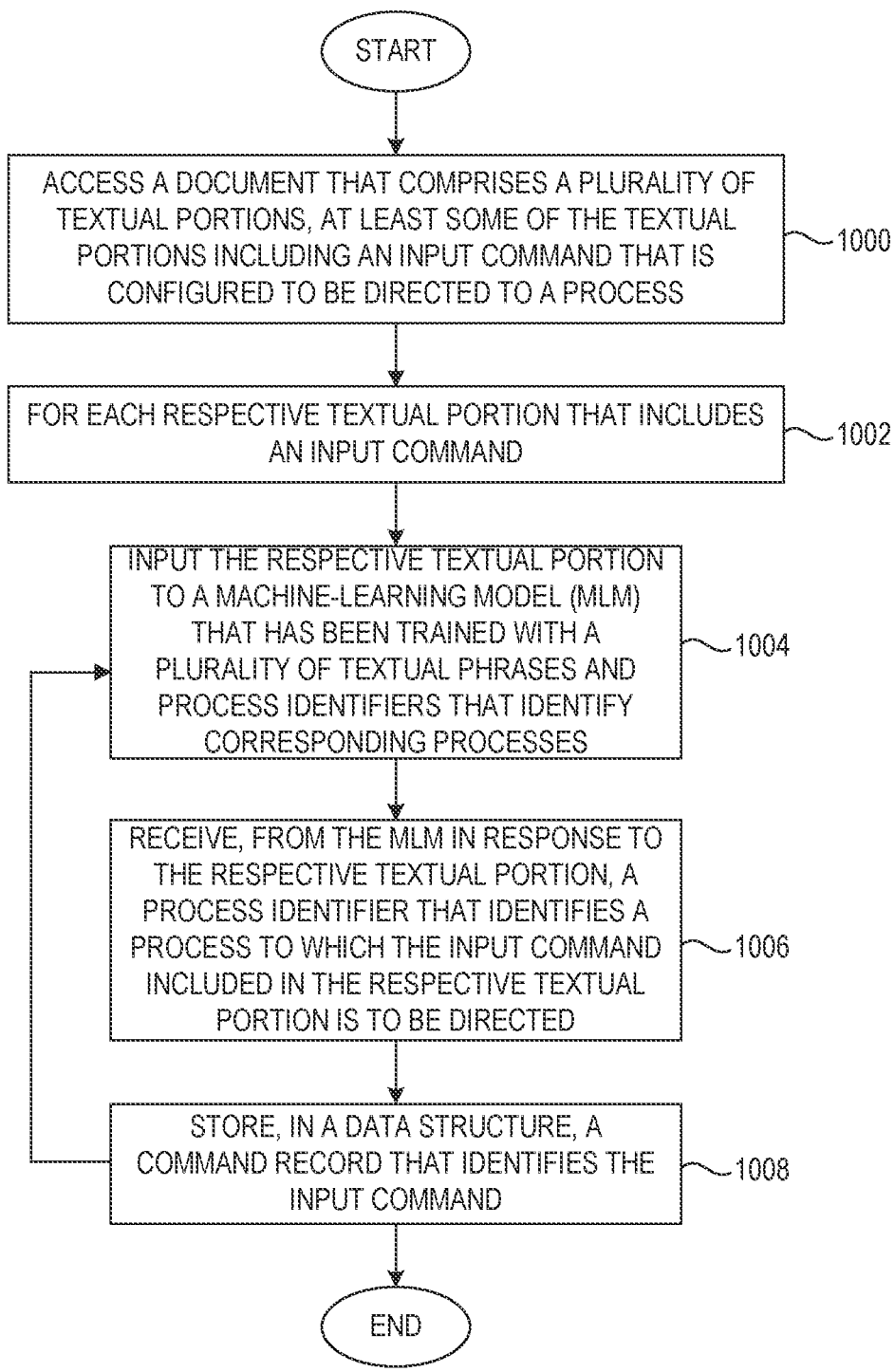
FIG. 2 is a flowchart of a method for automated verification of commands in a software product guide according to one example.

FIG. 2 is a flowchart of a method for automated verification of commands in a software product guide according to one example. FIG. 2 will be discussed in conjunction with FIG. 1. The computer system 12 accesses the software product guide 26-1 that includes the plurality of textual portions 28, at least some of the textual portions 28 including an input command that is configured to be directed to a process (FIG. 2, block 1000). For each respective textual portion 28 that includes an input command, the computer system 12 inputs the respective textual portion 28 to the MLM 22 that has been trained with a plurality of textual phrases and process identifiers that identify corresponding processes (FIG. 2, blocks 1002, 1004). The computer system 12 receives, from the MLM 22 in response to the respective textual portion 28, a process identifier that identifies a process to which the input command included in the respective textual portion 28 is to be directed (FIG. 2, block 1006). The computer system 12 stores, in a data structure, in this example, the command file 34-1, the command record 32-1 that identifies the input command (FIG. 2, block 1008). The computer system 12 successively accesses the next textual portion 28 and repeats blocks 1004-1008 until all the textual portions 28 have been processed. As discussed above, the computer system 12 may store command records in different data structures, such as the command files 34-1-34-3, such that each command file 34-1-34-3 identifies input commands that are to be directed to a particular process.

Figure 3:
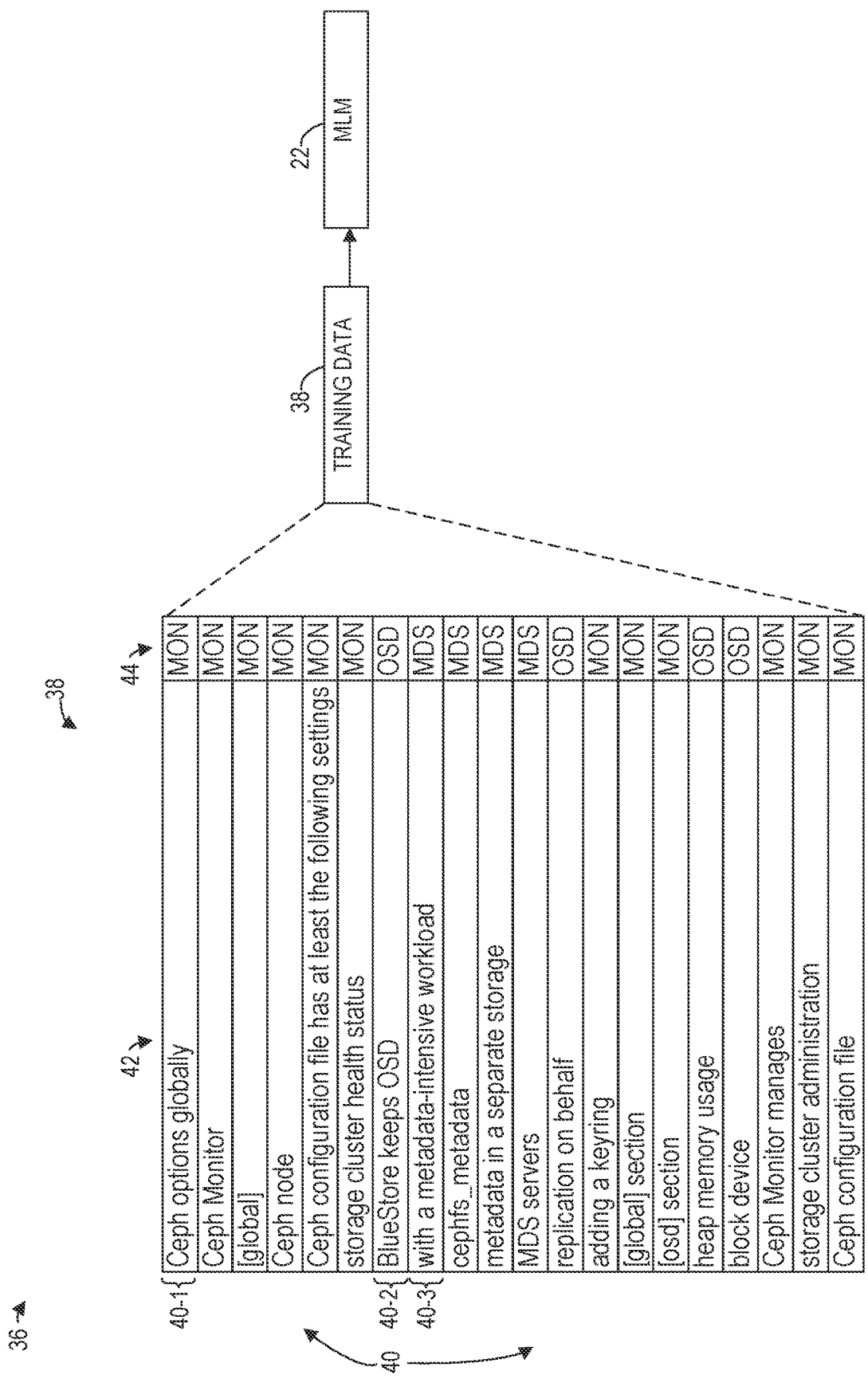
FIG. 3 is a block diagram of an environment suitable for training a machine learning model (MLM) to identify input commands in a textual portion of a document according to one implementation.

FIG. 3 is a block diagram of an environment 36 suitable for training the MLM 22 to identify input commands in a textual portion of a document according to one implementation. In this example, training data 38 is provided to the MLM 22. The training data 38 includes a plurality of rows 40-1, 40-2, 40-3, 40 (generally, rows 40) of data, each row 40 of data including a textual phrase 42, and a corresponding process identifier 44 that identifies a process that is associated with, or corresponds to, the textual phrase 42. In this example, the textual phrase 42 of the row 40-1 is "Ceph options globally", and the process identifier 44 is "MON". The process identifier 44 of the row 40-1 identifies a ceph-monitor process (i.e., the cluster monitor daemon for the Ceph distributed file system). The textual phrase 42 of the row 40-2 is "BlueStore keeps OSD", and the process identifier 44 of the row 40-2 is "OSD". The process identifier 44 of the row 40-2 identifies a ceph-osd process (i.e., the object storage daemon for the Ceph distributed file system). The textual phrase 42 of the row 40-3 is "with a metadata-intensive workload", and the process identifier 44 of the row 40-3 is "MDS". The process identifier 44 of the row 40-3 identifies a ceph-mdsprocess (i.e., the metadata server daemon for the Ceph distributed file system).

While for purposes of illustration only the training data 38 comprises twenty rows 40 and contains rows 40 that relate to three processes, in practice the training data 38 may comprise hundreds or thousands of rows 40 that relate to hundreds or thousands of different processes.

The MLM 22 includes an algorithm, such as that of a sentiment analysis algorithm that, given the training data 38, learns to identify which process identifiers are associated with various textual portions of a document. As the MLM 22 is trained, various criteria of the particular learning algorithm may be altered until the output of the MLM 22 reaches a desired accuracy such that, subsequent to being trained, input to the MLM 22 of a textual phrase with which a process identifier is associated results in an output by the MLM 22 of the process identifier associated with the textual phrase.

While sentiment analysis is one suitable learning algorithm, the examples disclosed herein are not limited to any particular learning algorithm or type of MLM 22, and can utilize any suitable learning algorithm, such as, by way of non-limiting example, topic modeling or the like. The MLM 22 may comprise, by way of non-limiting example, a Naive Bayes MLM, a Multinomial Naive Bayes MLM, a Support Vector Machine MLM, a Logistic Regression MLM, or the like.

Figure 4:
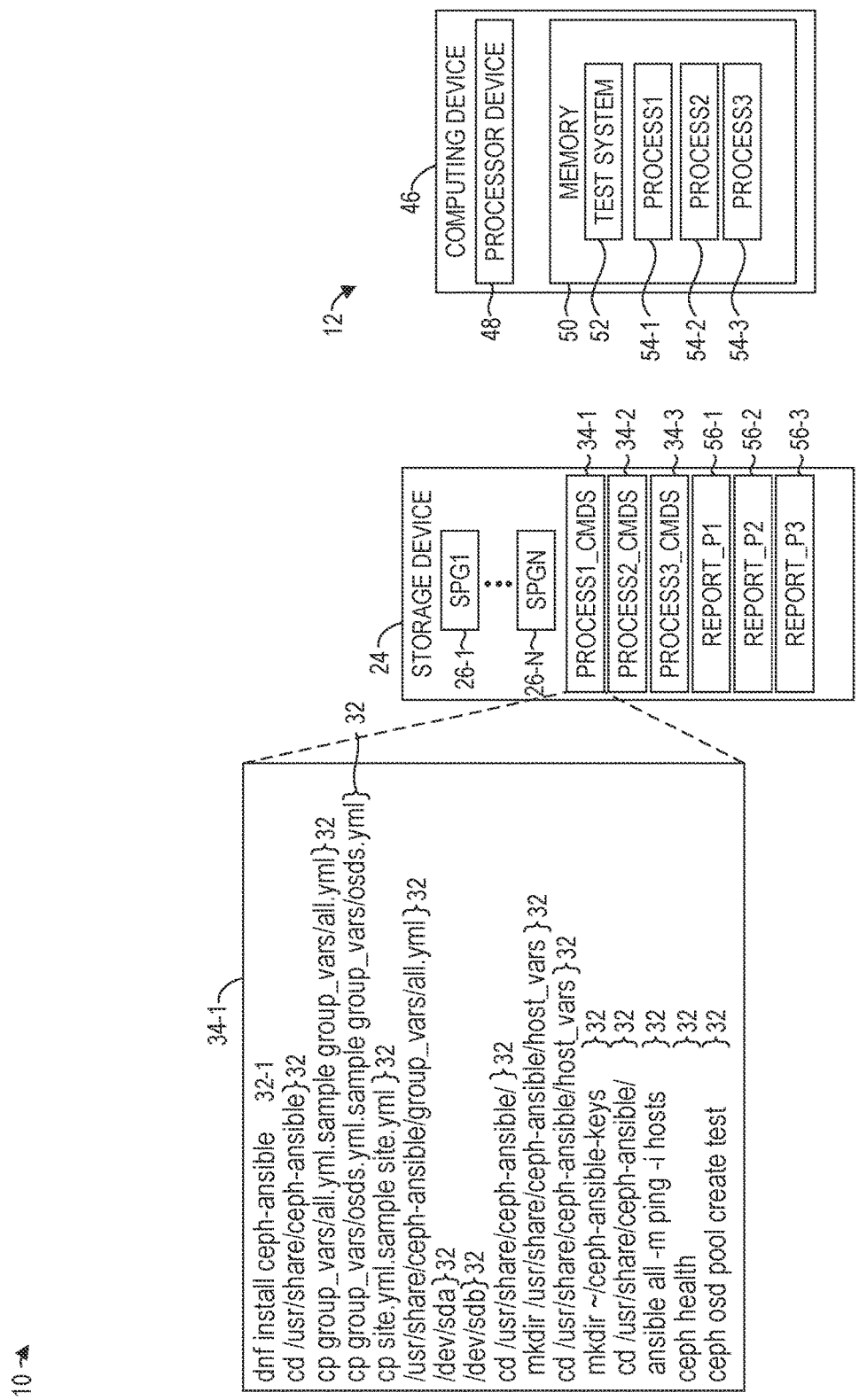
FIG. 4 is a block diagram of the environment illustrated in FIG. 1 including additional components for sending input commands to processes to verify whether such input commands are correct or incorrect, according to one implementation.

FIG. 4 is a block diagram of the environment 10 illustrated in FIG. 1 including additional components for sending input commands to processes to verify whether such input commands are correct or incorrect, according to one implementation. Certain components illustrated in FIG. 1 have been omitted due to spatial limitations. In this example, the computer system 12 includes a computing device 46 that includes one or more processor devices 48. The one or more processor devices 48 are coupled to a memory 50. A test system 52 executes in the memory 50. The test system 52 receives a request to verify the input commands identified in the command files 34-1-34-3 subsequent to the SPG verifier 20 processing the software product guide 26-1, as discussed above. The test system 52 accesses the command file 34-1, and for each respective command record 32 in the command file 34-1, directs the input command identified by the respective command record 32 to a process 54-1 that corresponds to the command file 34-1. The test system 52 determines that the input command was successful or unsuccessful. In some examples, the test system 52 may analyze log records generated by the process 54-1 or otherwise access information generated that indicates whether the input command was successful or not. The test system 52 then generates information that identifies the input command and whether the input command was successful or unsuccessful. The information may be stored in another data structure, such as a report 56-1, sent to a destination, or otherwise communicated to a desired location.

The test system 52 accesses the command file 34-2, and for each respective command record 32 in the command file 34-2, directs the input command identified by the respective command record 32 to a process 54-2 that corresponds to the command file 34-2. The test system 52 determines that the input command was successful or unsuccessful. The test system 52 then generates information that identifies the input command and whether the input command was successful or unsuccessful. The information may be stored in another data structure, such as a report 56-2.

The test system 52 accesses the command file 34-3, and for each respective command record 32 in the command file 34-3, directs the input command identified by the respective command record 32 to a process 54-3 that corresponds to the command file 34-3. The test system 52 determines that the input command was successful or unsuccessful. The test system 52 then generates information that identifies the input command and whether the input command was successful or unsuccessful. The information may be stored in another data structure, such as a report 56-3.

A user may then access the reports 56-1-56-3 to determine whether the commands were successful or unsuccessful and, if the latter, revise the software product guide 26-1 accordingly.

While solely for purposes of illustration the processes 54-1-54-3 are illustrated as executing on the same computing device, in other examples, the processes 54-1-54-3 may each execute on a separate computing device. Moreover, while solely for purposes of illustration the test system 52 has been described as being separate from the SPG verifier 20 and executing on a different computing device from which the SPG verifier 20 executes, in other implementations, the SPG verifier 20 and the test system 52 may execute on the same computing device, and in some implementations, the SPG verifier 20 and the test system 52 may be a single component. Irrespective of the specific implementation, the examples may be implemented on a computer system, such as the computer system 12, that includes one or more processor devices 16, 48 of one or more computing devices 14, 46.

Figure 5:
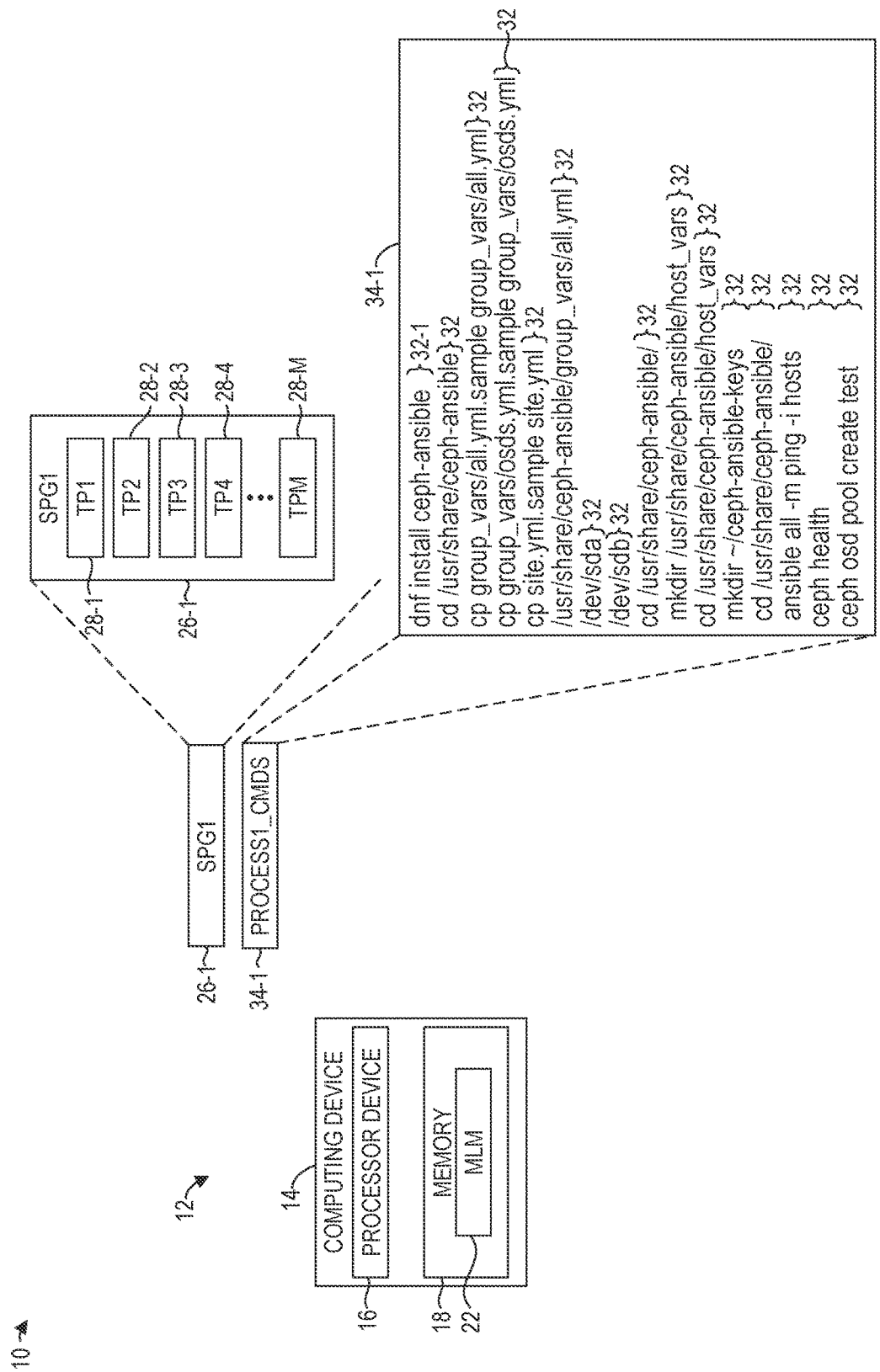
FIG. 5 is a simplified block diagram of the environment illustrated in FIG. 1 according to one implementation.

FIG. 5 is a simplified block diagram of the environment 10 illustrated in FIG. 1 according to one implementation. The computer system 12 includes the one or more processor devices 16 of one or more computing devices 14, the one or more processor devices 16 to access the document, such as the software product guide 26-1, that includes the plurality of textual portions 28, at least some of the textual portions 28 including an input command that is configured to be directed to a process. The one or more processor devices 16 are further to, for each respective textual portion 28 that includes an input command, input the respective textual portion 28 to the MLM 22 that has been trained with a plurality of textual phrases 42 and process identifiers 44 that identify corresponding processes. The one or more processor devices 16 are further to, for each respective textual portion 28 that includes an input command, receive, from the MLM 22 in response to the respective textual portion 28, a process identifier 44 that identifies a process to which the input command included in the respective textual portion 28 is to be directed, and store, in a data structure such as the command file 34-1, a command record 32 that identifies the input command.

Figure 6:
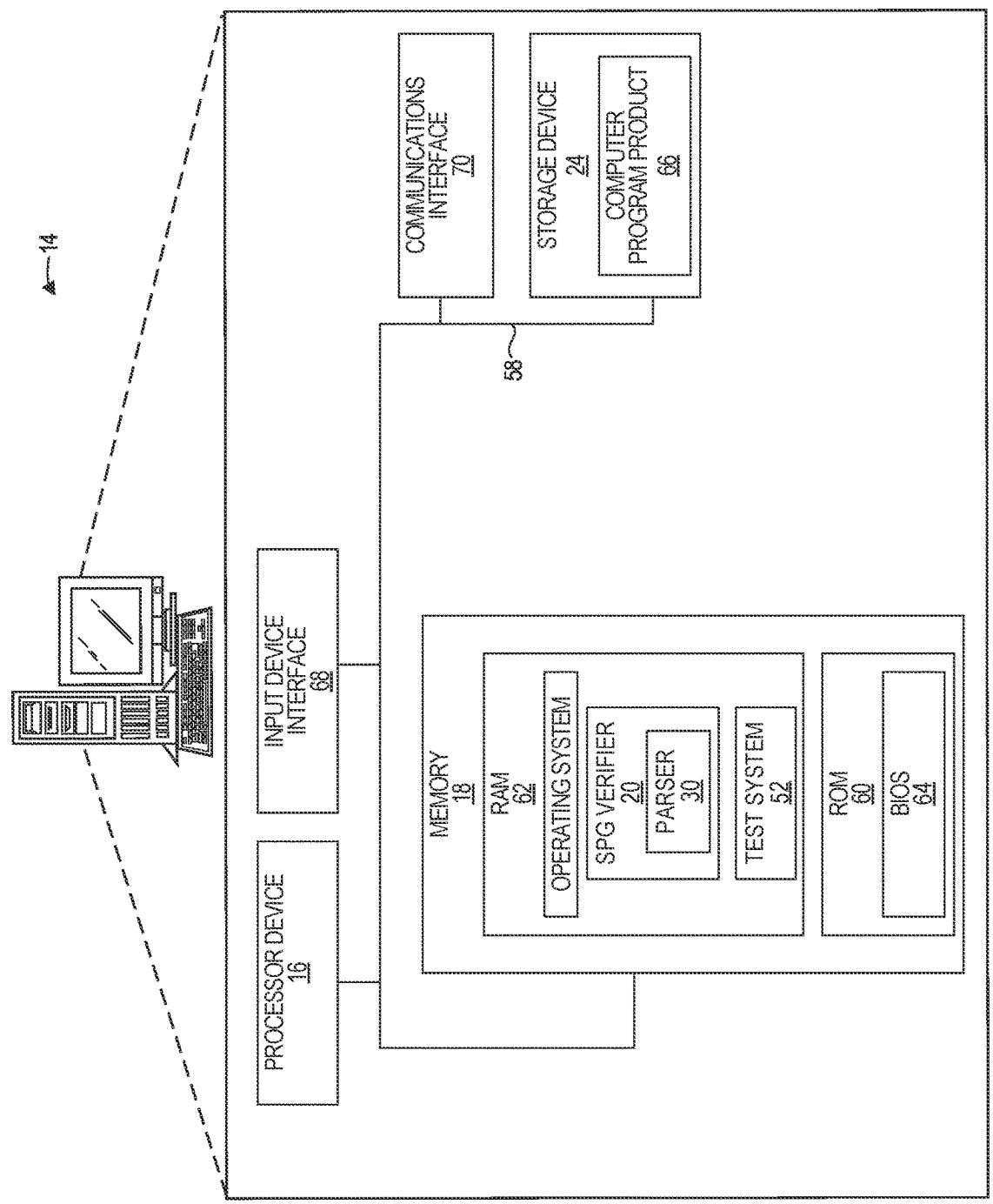
FIG. 6 is a block diagram of the computing device illustrated in FIG. 1 according to one example.

FIG. 6 is a block diagram of the computing device 14 suitable for implementing examples according to one example. The computing device 14 may comprise any computing or electronic device capable of including firmware, hardware, and/or executing software instructions to implement the functionality described herein, such as a computer server, a desktop computing device, a laptop computing device, or the like. The computing device 14 includes the processor device 16, the system memory 18, and a system bus 58. The system bus 58 provides an interface for system components including, but not limited to, the system memory 18 and the processor device 16. The processor device 16 can be any commercially available or proprietary processor.

The system bus 58 may be any of several types of bus structures that may further interconnect to a memory bus (with or without a memory controller), a peripheral bus, and/or a local bus using any of a variety of commercially available bus architectures. The system memory 18 may include non-volatile memory 60 (e.g., read-only memory (ROM), erasable programmable read-only memory (EPROM), electrically erasable programmable read-only memory (EEPROM), etc.), and volatile memory 62 (e.g., random-access memory (RAM)). A basic input/output system (BIOS) 64 may be stored in the non-volatile memory 60 and can include the basic routines that help to transfer information between elements within the computing device 14. The volatile memory 62 may also include a high-speed RAM, such as static RAM, for caching data.

The computing device 14 may further include or be coupled to a non-transitory computer-readable storage medium such as the storage device 24, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 24 and other drives associated with computer-readable media and computer-usable media may provide non-volatile storage of data, data structures, computer-executable instructions, and the like.

A number of modules can be stored in the storage device 24 and in the volatile memory 62, including an operating system and one or more program modules, such as the SPG verifier 20 and/or the test system 52, which may implement the functionality described herein in whole or in part. All or a portion of the examples may be implemented as a computer program product 66 stored on a transitory or non-transitory computer-usable or computer-readable storage medium, such as the storage device 24, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the SPG verifier 20 and/or the test system 52 in the volatile memory 62, may serve as a controller, or control system, for the computing device 14 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 16 through an input device interface 68 that is coupled to the system bus 58 but can be connected by other interfaces such as a parallel port, an Institute of Electrical and Electronic Engineers (IEEE) 1394 serial port, a Universal Serial Bus (USB) port, an IR interface, and the like. The computing device 14 may also include a communications interface 70, such as an Ethernet transceiver or the like, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
accessing, by a computing system comprising one or more processor devices, a document that comprises a plurality of textual portions, at least some of the textual portions including an input command that is configured to be directed to a process;
processing the document to identify a first textual portion of the plurality of the textual portions containing a first input command and a second textual portion of the plurality of the textual portions containing a second input command;
subsequent to processing the document, inputting the first textual portion to a machine-learning model (MLM) that has been trained with a plurality of textual phrases and process identifiers that identify corresponding processes;
receiving, from the MLM in response to the first textual portion, a first process identifier that identifies a first process to which the first input command included in the first textual portion is to be directed;
subsequent to inputting the first textual portion to the MLM, inputting the second textual portion to the MLM;
receiving, from the MLM, a second process identifier that identifies a second process to which the second input command is to be directed, the second process being different than the first process;
using a test system to verify whether the first input command is a correct command for the first process;
using the test system to verify whether the second input command is a correct command for the second process;
storing, in a first data structure that corresponds to the first process, a first command record of a plurality of command records that identifies the first input command and information that identifies whether the first input command is the correct command for the first process;
storing, in a second data structure that corresponds to the second process, a second command record of the plurality of command records that identifies the second input command and information that identifies whether the second input command is the correct command for the second process; and
storing, in the first data structure and the second data structure, order information that identifies a sequential order in which input commands identified by the command records in the first data structure and the second data structure are to be directed to the first process and the second process.

2. The method of claim 1 wherein the first data structure comprises a plurality of first command records, each first command record of the plurality of first command records identifying a different first input command to be directed to the first process, and the second data structure comprises a plurality of second command records, each second command record of the plurality of second command records identifying a different second input command to be directed to the second process, and further comprising:
accessing the first data structure;
for each respective first command record of the plurality of first command records:
directing the first input command identified by the respective first command record to the first process;
determining that the first input command was successful or unsuccessful; and
storing information that identifies the first input command and whether the first input command was successful or unsuccessful;
accessing the second data structure; and
for each respective second command record of the plurality of second command records:
directing the second input command identified by the respective second command record to the second process;
determining that the second input command was successful or unsuccessful; and
storing information that identifies the second input command and whether the second input command was successful or unsuccessful.

3. The method of claim 1 wherein the document comprises a software product installation guide.

4. The method of claim 1, wherein processing the document to identify the first textual portion and the second textual portion comprises:
parsing the first textual portion and the second textual portion using a regular expression configured to identify input commands based on a syntax of input commands.

5. The method of claim 1 further comprising:
training the MLM using textual phrases and corresponding process identifiers associated with the textual phrases, such that, subsequent to being trained, input of a textual phrase with which a process identifier is associated results in an output of the process identifier associated with the textual phrase.

6. The method of claim 1 wherein each command record of the plurality of command records identifies a different input command to be directed to the process, and further comprising:
accessing the first data structure and the second data structure; and
for each respective command record of the plurality of command records:
directing the input command identified by the respective command record to the process;
determining that the input command was successful or unsuccessful; and
storing information that identifies the input command and whether the input command was successful or unsuccessful.

7. The method of claim 1 wherein the process comprises a Linux daemon.

8. A computer system comprising:
one or more processor devices of one or more computing devices, the one or more processor devices to:
access a document that comprises a plurality of textual portions, at least some of the textual portions including an input command that is configured to be directed to a process;
process the document to identify a first textual portion of the plurality of the textual portions containing a first input command and a second textual portion of the plurality of the textual portions containing a second input command;
subsequent to processing the document, input the first textual portion to a machine-learning model (MLM) that has been trained with a plurality of textual phrases and process identifiers that identify corresponding processes;

receive, from the MLM in response to the first textual portion, a first process identifier that identifies a first process to which the first input command included in the first textual portion is to be directed;

subsequent to inputting the first textual portion to the MLM, input the second textual portion to the MLM;

receive, from the MLM, a second process identifier that identifies a second process to which the second input command is to be directed, the second process being different than the first process;

use a test system to verify whether the first input command is a correct command for the first process;

use the test system to verify whether the second input command is a correct command for the second process;

store, in a first data structure that corresponds to the first process, a first command record of a plurality of command records that identifies the first input command and information that identifies whether the first input command is the correct command for the first process;

store, in a second data structure that corresponds to the second process, a second command record of the plurality of command records that identifies the second input command and information that identifies whether the second input command is the correct command for the second process; and store, in the first data structure and the second data structure, order information that identifies a sequential order in which input commands identified by the command records in the first data structure and the second data structure are to be directed to the first process and the second process.

9. The computer system of claim 8 wherein the one or more processor devices are further to:

train the MLM using textual phrases and corresponding process identifiers associated with the textual phrases, such that, subsequent to being trained, input of a textual phrase with which a process identifier is associated results in an output of the process identifier associated with the textual phrase.

10. The computer system of claim 8 wherein each command record of the plurality of command records identifies a different input command to be directed to the process, and wherein the one or more processor devices are further to:

access the first data structure and the second data structure; and for each respective command record of the plurality of command records:

direct the input command identified by the respective command record to the process;

determine that the input command was successful or unsuccessful; and store information that identifies the input command and whether the input command was successful or unsuccessful.

11. A non-transitory computer-readable storage medium that includes executable instructions configured to cause one or more processor devices to:

access a document that comprises a plurality of textual portions, at least some of the textual portions including an input command that is configured to be directed to a process;

process the document to identify a first textual portion of the plurality of the textual portions containing a first input command and a second textual portion of the plurality of the textual portions containing a second input command;

subsequent to processing the document, input the first textual portion to a machine-learning model (MLM) that has been trained with a plurality of textual phrases and process identifiers that identify corresponding processes;

receive, from the MLM in response to the first textual portion, a first process identifier that identifies a first process to which the first input command included in the first textual portion is to be directed;

subsequent to inputting the first textual portion to the MLM, input the second textual portion to the MLM;

receive, from the MLM, a second process identifier that identifies a second process to which the second input command is to be directed, the second process being different than the first process;

use a test system to verify whether the first input command is a correct command for the first process;

use the test system to verify whether the second input command is a correct command for the second process;

store, in a first data structure that corresponds to the first process, a first command record of a plurality of command records that identifies the first input command and information that identifies whether the first input command is the correct command for the first process;

store, in a second data structure that corresponds to the second process, a second command record of the plurality of command records that identifies the second input command and information that identifies whether the second input command is the correct command for the second process; and store, in the first data structure and the second data structure, order information that identifies a sequential order in which input commands identified by the command records in the first data structure and the second data structure are to be directed to the first process and the second process.

12. The non-transitory computer-readable storage medium of claim 11 wherein the instructions further cause the one or more processor devices to:

train the MLM using textual phrases and corresponding process identifiers associated with the textual phrases, such that, subsequent to being trained, input of a textual phrase with which a process identifier is associated results in an output of the process identifier associated with the textual phrase.

13. The non-transitory computer-readable storage medium of claim 11 wherein, each command record of the plurality of command records identifies a different input command to be directed to the process, and wherein the instructions further cause the one or more processor devices to:

access the first data structure and the second data structure; and for each respective command record of the plurality of command records:

direct the input command identified by the respective command record to the process;

determine that the input command was successful or unsuccessful; and store information that identifies the input command and whether the input command was successful or unsuccessful.

* * * * *